(12) United States Patent
Cacas

(10) Patent No.: US 7,257,488 B2
(45) Date of Patent: Aug. 14, 2007

(54) METHOD OF SEDIMENTOLOGIC INTERPRETATION BY ESTIMATION OF VARIOUS CHRONOLOGICAL SCENARIOS OF SEDIMENTARY LAYERS DEPOSITION

(75) Inventor: Marie-Christine Cacas, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 11/411,897

(22) Filed: Apr. 27, 2006

(65) Prior Publication Data

US 2006/0247858 A1 Nov. 2, 2006

(30) Foreign Application Priority Data

Apr. 29, 2005 (FR) .................................. 05 04464

(51) Int. Cl.
*G06F 19/00* (2006.01)
(52) U.S. Cl. ........................................................ 702/2
(58) Field of Classification Search ................ 702/2, 702/14, 16; 367/37, 38
See application file for complete search history.

(56) References Cited

U.S. PATENT DOCUMENTS

| | | | |
|---|---|---|---|
| 5,148,494 A * | 9/1992 | Keskes .................... | 382/109 |
| 5,844,799 A | 12/1998 | Joseph et al. | |
| 6,597,995 B1 | 7/2003 | Cornu et al. | |
| 6,771,800 B2 * | 8/2004 | Keskes et al. ............... | 382/109 |
| 7,117,091 B2 * | 10/2006 | Masson et al. ................ | 702/5 |
| 2004/0267454 A1 | 12/2004 | Granjeon | |

FOREIGN PATENT DOCUMENTS

FR          2 885 227     * 11/2006

OTHER PUBLICATIONS

Quiquerez, A, et al: "DIBAFILL: a 3-D Two-Lithology Diffusive Model for Basin Infilling", Computers and Geosciences, Pergamon Press, Oxford, GB, vol. 26, No. 9-10, Nov. 2000 pp. 1029-1042, XP002319037, ISSN: 0098-3004.

Riveneas, J. C.: "Application of a Dual-Lithology, Depth-Dependent Diffusion Equation in Stratigraphic Simulation" Basin Research, Blackwell, Oxford, GB, vol. 4, 1992, pp. 133-146, XP00605803, ISSN: 0950-091X.

Lawrence, D. T., et al: "Stratigraphic Simulation of Sedimentary Basines: Concepts and Calibration", AAPG Bulletin—The American Association of Petroleum Geologists Bulletin, Okla., U.S., vol. 74, No. 3, Mar. 1, 1990, pp. 273-295, XP000605713.

* cited by examiner

*Primary Examiner*—Michael Nghiem
(74) *Attorney, Agent, or Firm*—Antonelli, Terry, Stout & Kraus, LLP.

(57) ABSTRACT

A method having application for the development of oil reservoirs for automatically extracting from a seismic image pertinent information for sedimentologic interpretation by using estimations of realistic chronological scenarios of sedimentary layers deposition. The method includes iterative estimation of a first and of a second chronological scenario of the deposition of sedimentary layers, assuming that each reflector settles at the earliest and at the latest possible moment during the sedimentary depositional process. A chronological level number is assigned to a group of initial reflectors. Then a chronological level number is incremented by one and decremented by one which numbers are assigned to the reflectors including pixels located above and respectively below the initial reflectors and above and respectively below no other reflector. An interpretation of these two chronological scenarios is eventually carried out so as to reconstruct the depositional conditions of the sedimentary layers.

29 Claims, 7 Drawing Sheets

METHOD OF SEDIMENTOLOGIC INTERPRETATION BY ESTIMATION OF VARIOUS CHRONOLOGICAL SCENARIOS OF SEDIMENTARY LAYERS DEPOSITION

BACKGROUND OF THE INVENTION

1. Field of the Invention

The present invention relates to a method for extracting automatically pertinent information for sedimentologic interpretation, in order to reconstruct the depositional conditions under which sedimentary layers have formed.

2. Description of the Prior Art

Sedimentology reconstructs environments wherein the various rocks samples of which are studied have formed. The subsoil has of piles of sedimentary layers that have settled in sub-horizontal position. The nature of the rocks that make up these layers can vary from one layer to the next, notably depending on the water depth under which the sediment has settled. These layers have a limited lateral extension because the sedimentation process does not affect the whole of the earth's surface at a given time of the geologic history.

Stratigraphy is that branch of geology that studies the order in which the rock layers that make up the earth's crust have formed through the geologic times, in particular the sedimentary rocks. It allows establishing a relative chronology referred to as stratigraphic chronology, notably through the reasoned use of two principles: a layer has the same age throughout its length and breadth, and the lower of two superposed layers is also the older. Thus units are obtained that can be differentiated according to the nature of the arguments used to define them: lithostratigraphic units, biostratigraphic units and chronostratigraphic units. The latter are characterized by sets of layers that are made to agree with time intervals (referred to as geochronological units).

On the other hand, seismic imagery is a method of observing the architecture of these layers. This technique is based on the emission of acoustic signals in the subsoil and recording of the signals propagated and reflected on particular acoustic reflectors. These signals are processed so as to form a two or three-dimensional seismic image. This seismic image is a series of vertical records referred to as seismic traces. These seismic traces represent the amplitude of the signal received as a function of time. The recorded signals generally correlate from one trace to the next, which is translated, in a seismic image, into sub-horizontal lines, more or less rectilinear, thick and continuous, referred to as lineations. These lines represent the interfaces between sedimentary layers. Thus, a two-dimensional seismic image corresponds to a vertical section of the subsoil. An example of a two-dimensional seismic image is given by FIG. 1.

The sedimentary layers can be worn away by erosion and deformed by the tectonic history of the subsoil after deposition. Thus, the current architecture of the layers shown by seismic imagery can reach a high degree of complexity which makes the task very complicated when trying to reconstruct the geologic history undergone thereby.

Now, in the field of oil exploration, one of the objectives of the interpretation of these images (referred to as seismic stratigraphy) is precisely to analyze the architecture observed to reconstruct the history of the sedimentary deposits, in order to locate the sediments that are likely to constitute oil reservoirs. The criteria used to identify hydrocarbon-containing layers are essentially based on the estimation of the position of the sea level at the time of their deposition. For example, the sandiest sediments are generally located at the deltas found along the coastlines of the continents. These coastlines vary in the course of geologic time as a function of the sea level variations and of tectonic movements such as subsidence (earth's crust collapse) or the uplift of mountain ranges.

From the observation of seismic images, the interpreter has a certain number of more or less empirical rules for determining the water depth below which a sediment has settled. This judgment is notably based on the analysis of the relative position of the layers or on the way these layers are organized: parallel layers can indicate a regular deposit at great depth, secant layers can indicate an emersion stage interposed between the depositional stages, etc.

Interpretation is often very complicated and it entirely depends on the interpreter's sedimentologic expertise. There are few tools providing assistance in this task, which is all the more complex as a seismic image often shows several hundred layers.

The base principles of seismic stratigraphy, that is the sedimentologic interpretation of seismic images, were set out by Vail et al. in the 70s (Vail P. R., et al., 1977, "*Seismic Stratigraphy and Global Changes of Sea Level*", in C. E. Payton ed., "*Seismic Stratigrapy Application to Hydrocarbon Exploration*": American Association of Petroleum Geologists Memoir 26, p. 49–212). The concepts proposed by Vail et al. have not changed much since, but seismic acquisition surveys, notably for acquisition of seismic data in three dimensions, have spread significantly in the field of hydrocarbon exploration and production. Their large number requires a decrease in the time spent by the interpreter for processing these data.

Interpretation of the acquired data is performed by an interpreter trained in the principles of seismic stratigraphy. Considering the large amount of data to be processed, interpretation is carried out by means of softwares referred to as "seismic interpretation stations". These seismic interpretation stations provide three functionality categories concerning the invention:

(1) Tools allowing semi-automatic extraction of seismic reflectors from a "seed" picked by the interpreter on the analyzed image. Research work has been undertaken for several years now for global and entirely automated extraction of all the interfaces. Examples thereof are the method described in French Patent 2,646,520 and corresponding U.S. Pat. No. 5,148,494 or more recent work described in:

M. Faraklioti, M. Petrou, "*Horizon Picking in 3DSeismic Data Volumes*", Machine Vision and Applications, vol. 15, No. 4, October 2004.

(2) Tools for calculating seismic attributes (scalar or vector quantities estimated by mathematical processing). Examples thereof are the public report "TriTex IST-1999-20500, Feasability and Literature Study", November 2001, which assesses the calculation of attributes referred to as "texture attributes", or the review "The Leading Edge", October 2002, vol. 21, No. 10, which presents a series of articles on seismic attributes.

(3) Chronostratigraphic interpretation methods wherein the chronology of deposition of the sedimentary deposits is estimated. An example thereof is the method described by N. Keskes in French Patent 2,808,336 and corresponding U.S. Pat. No. 6,771,800. This method is based on the calculation of a vector field applied onto the image and which describes at any point the mean local orientation of the reflectors in the vicinity of this point. A network of lines tangential at any point to this vector field, the "flowlines", is then calculated. The local density of the flowlines is then interpreted in terms of rate of sedimentation. It can be noted that this method cannot be implemented if the initial image corresponds to a geologic medium comprising stratigraphic discontinuities such as faults, because no flowline can be propagated through these discontinuities. It can also be noted that this method provides only one chronostratigraphic interpretation out of all the possible interpretations; notably, it does not allow providing of a chronostratigraphic interpretation respecting a priori flowlines imposed by the operator.

SUMMARY OF THE INVENTION

The present invention comprises an estimation of realistic chronological scenarios of the deposition of sedimentary layers.

The invention relates to a method for reconstructing depositional conditions under which sedimentary layers have formed, from chronological classifications of reflectors forming lines of pixels extracted from an image representing seismic signal amplitudes. The method comprises:

A. Carrying out iteratively an estimation of a first and of a second chronological scenario of the deposition of sedimentary layers, by assigning to each reflector two chronological level numbers, $T_{up}$ and $T_{down}$ respectively, determined from the following:

a) assigning an initial first chronological level number $T_{up}$ to a first group of reflector, and an initial second chronological level number $T_{down}$ to a second group of reflectors;

b) assigning a chronological level number $T_{up}=T_{up}+1$ to the reflectors made up of pixels located above the reflectors of the first group and above no other reflector, these reflectors assigned to level $T_{up}+1$ making up the new reflectors of the first group;

c) assigning a chronological level number $T_{down}=T_{down}-1$ to the reflectors made up of pixels located below the reflectors of the second group and below no other reflector, these reflectors assigned to level $T_{down}-1$ making up the new reflectors of said second group;

d) starting again from b), and the stopping when all the reflectors are assigned to two chronological levels.

B. Performing an interpretation of the chronological scenarios so as to reconstruct the depositional conditions.

According to the invention, the estimation of a chronological scenario can respect at least one additional constraint imposed by an interpreter, such as a particular isochrone that has to be assigned to a single chronological level. An isochrone comprises a set of reflectors.

According to the invention, chronological scenarios can be interpreted by means of various methods such as those described below:

The chronological scenarios can be interpreted by defining zones of a low and of a high rate of sedimentation by means of an attribute D defined as the difference between the chronological level numbers $T_{up}$ and the chronological level numbers $T_{down}$, at each pixel of the image;

The chronological scenarios can be interpreted by defining the interfaces between sedimentary bodies of the underground medium by means of an attribute D' calculated at any pixel of a reflector, and defined as the difference between the value of attribute D of a reflector passing through the pixel and the value of attribute D of a reflector located just above or below the reflector, in line with the pixel considered;

The chronological scenarios can be interpreted by determining a position of an isochrone for a given chronological level numbered $T_{iso}$, as well as an uncertainty range for the position, by displaying the reflectors according to three different color codes corresponding to three different domains defined as follows:

All the reflectors whose chronological level number $T_{up}$ comes after the level number sought $T_{iso}$, ($T_{up}>T_{iso}$) make up domain I All the reflectors whose chronological level number $T_{down}$ is prior to the level number sought $T_{iso}$ ($T_{down}<T_{iso}$) make up domain II; and All the reflectors that may have potentially settled at the level sought ($T_{up}<T_{iso}<T_{down}$) make up domain III, which is the uncertainty domain.

The invention can also apply to three-dimensional images. In this case, the images can be defined by a first set of sections and a second set of perpendicular sections, and the estimation of chronological scenarios can then comprise the following:

Defining a selection of sections of the first and of the second set of sections;

Constructing isochrones by assembling reflectors that intersect on intersection lines between perpendicular sections of the selection; and Carrying in out an estimation of the chronological scenarios for all of the reflectors extracted from all the sections considered, by utilizing as the constraint the isochrones.

Finally, according to the invention, extraction of the reflectors can comprise at least one of the following:

1) Carrying out a transformation of the image into an image comprising only two color levels;

2) Making a change in the image with two color levels by transforming lineations of the images into lines that keep the same vicinity relations and whose thickness is that of a pixel, from a mathematical morphology operation;

3) Constructing the reflectors by splitting up each one of the lines having ramifications from a vectorization technique; and 4) Carrying out an optimization of the geometry of the reflectors, and this optimization can comprise at least one of the following:

a) Separating reflectors having a common end and testing two by two these reflectors so as to select reflector pairs whose orientations at the end form an angle of 180°, with a certain tolerance threshold, 20° for example, then reuniting, among the selected pairs, the pair that will form, after welding, the longest reflector;

b) Eliminating reflectors having at least one of the following characteristics: short length in relation to the average length of the reflectors, greater tortuosity than the average tortuosity and average orientation close to the vertical;

c) Splitting up some reflectors so that each one represents a broken line that has no cusp and no bifurcation, and intersecting no other reflector.

BRIEF DESCRIPTION OF THE FIGURES

Other features and advantages of the method according to the invention will be clear from reading the description hereafter of non limitative examples, with reference to the accompanying figures wherein.

DETAILED DESCRIPTION OF THE INVENTION

The method according to the invention applies to a seismic image. A seismic image is, horizontally, a spatial representation and, vertically, a temporal representation of the amplitudes of the recorded acoustic signals. These amplitudes generally correlate from one trace to the next, which is translated on the pixels making up the seismic image into lineations, that is sub-horizontal lines, more or less rectilinear, thick and continuous. These lineations represent the interfaces between sedimentary layers. Various color scales are conventionally used to represent these amplitude variations in an image. A two-dimensional seismic image represents a vertical seismic section of the subsoil by means of a continuous (levels of grey for example) or non-continuous color scale.

The method according to the invention is to automatically extracts, by image processing, pertinent information for sedimentologic interpretation in order to reconstruct the depositional conditions under which sedimentary layers have formed.

This method comprises an estimation of various (plausible) realistic chronological scenarios of sedimentary layers deposition. Interpretation of these chronological scenarios allows the sedimentologic interpretation to be refined.

1—Estimation of Chronological Scenarios

According to the invention, the estimation of chronological scenarios comprises a classification of reflectors corresponding to the interfaces between sedimentary layers located by seismic imagery. These reflectors constitute a set of pixels forming a line. Reflectors therefore have to be extracted from a seismic image prior to this estimation.

Reflectors Extraction

There are many techniques for extracting reflectors from a seismic image, well known in the art, such as those allowing semi-automatic extraction of seismic reflectors from a "seed" picked by the interpreter in the image analyzed. Examples thereof are the method described in French Patent 2,646,520 and corresponding U.S. Pat. No. 5,148,494 or more recent work described in:

M. Faraklioti, M. Petrou, "*Horizon Picking in 3DSeismic Data Volumes*", Machine Vision and Applications, Vol. 15, No. 4, October 2004.

Within the context of the method, a new technique is based on mathematical morphology and vectorization techniques. This reflector extraction method according to the invention is described hereafter.

Extraction of Reflectors by Seismic Image Vectorization

The reflectors according to the invention are defined as lines without bifurcation, that do not intersect and exhibit no right to left or left to right change of direction or conversely. These reflectors correspond to the interfaces between sedimentary layers located by seismic imagery.

Figure 1:
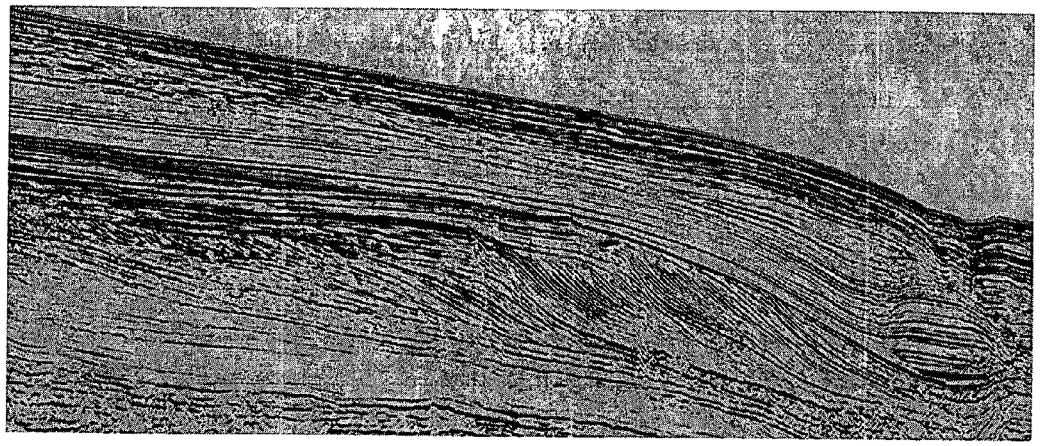
FIG. 1 shows an example of a two-dimensional seismic image.

Vectorization of the seismic image comprises the following stages:

E1. The seismic image is represented by means of a continuous scale, for example with levels of grey (FIG. 1). This image is changed into a binary image of equal size, that is having no more than two colors (black and white for example). The image is then referred to as "binarized" after a "binarization" operation. This operation is a conventional image analysis operation that can be carried out by means of many methods such as the method proposed in the document as follows:

Russ, J. C., *The Image Processing Handbook*, Second ed. 1995, Boca Raton, Fla.: CRC Press.

Figure 2:
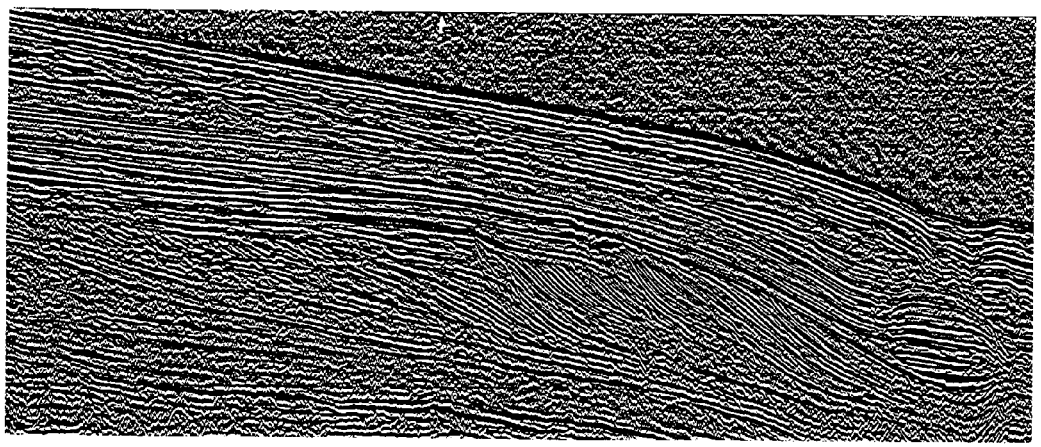
FIG. 2 shows the result of the "binarization" operation applied to the image of FIG. 1.

It is for example possible to use a thresholding technique well known in the art, which defines one or more thresholds and in assigning to each pixel one value or another according to its initial color level in relation to these thresholds. The "binarization" operation was applied to the image of FIG. 1 and the result is shown in FIG. 2.

In this example, the binarization operation is carried out as follows: at each pixel of the initial image, all of the amplitude values taken by all the pixels of a 20-pixel column centered on the pixel are considered. If the amplitude of the pixel analyzed is among the 30% lowest amplitudes of this column, the binarized value is set at 1; otherwise, it is set at 0.

Figure 3:
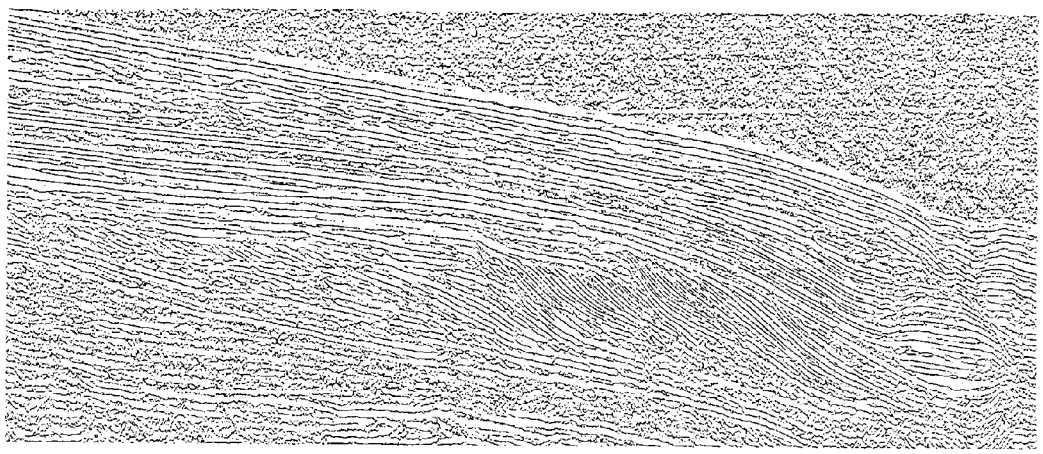
FIG. 3 shows the image of the figure skeletonized.

E2. The "binarized" image, or the initial image if it was already "binarized", is also changed into a binary image of equal dimension, referred to as "skeletonized image", wherein each lineation (set of pixels of the image having the same color) of a color of the initial image is brought down to a broken line, possibly ramified, having the same topology (the same neighbourhood relations) as the initial lineation. It is a conventional mathematical morphology operation. One may for example refer to the article by T. Y. Zhang and C. Y. Suen: "A Fast Parallel Algorithm for Thinning Digital Patterns", Commun. ACM, vol. 27, pp. 236–239, 1984. It is the method that was used for processing the black lineations of FIG. 2. The result is shown in FIG. 3.

E3. The "skeletonized" image is then vectorized: each broken line with ramifications is divided into reflectors, described by the succession of pixels from which they are made. By definition, the reflectors thus obtained have no ramification and exhibit two ends, at least one of which is in contact with another reflector of the broken line.

E4. When several reflectors have a common end, these reflectors are separated and two of them are selected to be welded. The orientation of each reflector at the end in contact is therefore calculated. The reflectors are then tested two by two so as to keep the pairs whose orientations at the end form an angle of 180° C., with a certain tolerance threshold. An acceptable threshold is 20° for example. The pair that will form, after welding, the longest reflector is thereafter selected from among the pairs kept. This strategy allows forming long and low-tortuosity reflectors.

Figure 4:
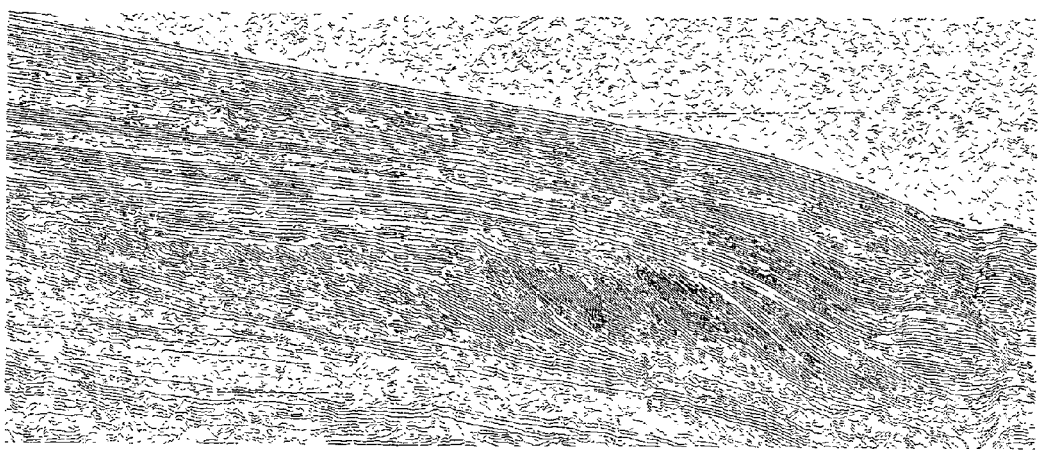
FIG. 4 illustrates the final vectorization result for the image of FIG. 3.

E5. All the reflectors selected are cleaned by eliminating the reflectors that are more likely to come from artifacts. These can be, for example, reflectors having at least one of the following characteristics: short length in relation to the average length of the reflectors, greater tortuosity than the average tortuosity and average orientation close to the vertical. FIG. 4 illustrates the final result of the vectorization of the image of FIG. 3.

E6. Finally, the reflectors are divided into two reflectors at their cusp, that is when they change from a direction going from the right of the image to the left of the image to a direction going from the left of the image to the right of the image, or conversely.

Stages E4, E5 and E6 are an optimization of the definition of the reflectors.

For a seismic image having a non-continuous color scale, it is necessary to apply E1 to E6 as many times as there are colors, by processing the lineations of a particular color one after the other. For example, if the seismic image is represented by means of a scale having three non-continuous colors C1, C2 and C3, this image is binarized a first time to convert the lineations of color C1 to reflectors, then E2 to E6 are applied to determine the reflectors corresponding to the lineations of color C1. The image is then again binarized so as to convert the lineations of color C2, and stages E2 to E6 are applied again to determine the reflectors corresponding to the lineations of color C2. The same iteration is finally carried out for the last color C3.

However, within a general context, an interpreter works with an interpretation station and therefore knows the value of the seismic amplitudes. Thus, to implement the method, conversion of the amplitudes to levels of grey is systematically used. On the other hand, using a previously colorized image (such as a scanned image for example) can require application of the iterative method described above.

Classification of the Reflectors in Chronological Deposition Order

The entire method is described in two dimensions. The extension to three dimensions is presented at the end of the description.

By construction, the reflectors may possibly be in contact at their ends, but they cannot be secant. Similarly, still by construction and by means of E6 of the procedure described above, a reflector is either above or below another reflector, but it can on no account be simultaneously above and below. A chronological order of deposition of the reflectors can thus be constructed, knowing that a reflector located below another reflector corresponds to a sediment that has settled before the latter.

A chronological order is described by a discrete set of successive chronological levels. A chronological level represents a time interval wherein sediments and therefore reflectors settle. The reflectors belonging to the same chronological level cannot be considered to be below or above another one; they all are at the same level, referred to as chronological level.

A chronology is thus an arbitrary discretization of time. There are generally several possible chronologies for a given reflector configuration. According to the method, the most compact chronologies possible are sought, that is comprising as little chronological levels as possible. One thus tries to place as many reflectors as possible in a single chronological level. Conversely, chronologies wherein a chronological level is assigned per reflector could be established.

Two chronologies corresponding to extreme situations are determined from among these compact chronologies: a first chronology is obtained by assuming that each reflector settles at the earliest possible moment during the formation of the medium (they are assigned a chronological level number $T_{up}$); the second one is obtained by assuming that each reflector settles at the latest possible moment (they are assigned a chronological level number $T_{down}$).

For the "at the earliest possible" chronology, an initial group of reflectors to which an initial chronological level number $T_{up}$ is assigned is therefore selected. Since these reflectors are associated with a single chronological level, they constitute an isochrone. Then, the whole of the reflectors that are entirely just above the already assigned reflectors, that is having the chronological level number $T_{up}=0$, is determined. A reflector is located "entirely" above another reflector if all of the pixels which represent the reflector are above the other reflector. "Just above" means that there is no other reflector between the two reflectors considered: they are the reflectors of pixels located above the assigned reflectors and above no other reflector. All these reflectors located entirely just above an already assigned reflector are assigned a chronological level number incremented by one in relation to the already assigned reflector located just below $T_{up}=T_{up}+1$. This operation is then repeated by seeking all of the reflectors that are entirely just above a recently assigned reflector, that is having the chronological level number $T_{up}=T_{up}+1$.

Similarly, for the "at the latest possible" chronology, an initial group of reflectors to which an initial chronological level number $T_{down}$ is assigned is selected. These reflectors are associated with a single chronological level and constitute an isochrone. Then, the whole of the reflectors that are entirely just below the already assigned reflectors, that is having the chronological level number $T_{down}=P$, is determined. All these reflectors located entirely just below an already assigned reflector are assigned a chronological level number decremented by one in relation to the already assigned reflector located just above $T_{down}=T_{down}-1$. This operation is then repeated by seeking all of the reflectors that are entirely just below a recently assigned reflector, that is having the chronological level number $T_{down}=T_{down}-1$.

These operations are repeated until all the reflectors are assigned to a "latest possible" chronological level and to an "earliest possible" chronological level.

An example of an algorithm allowing these two chronologies to be determined is presented hereafter.

Figure 5:
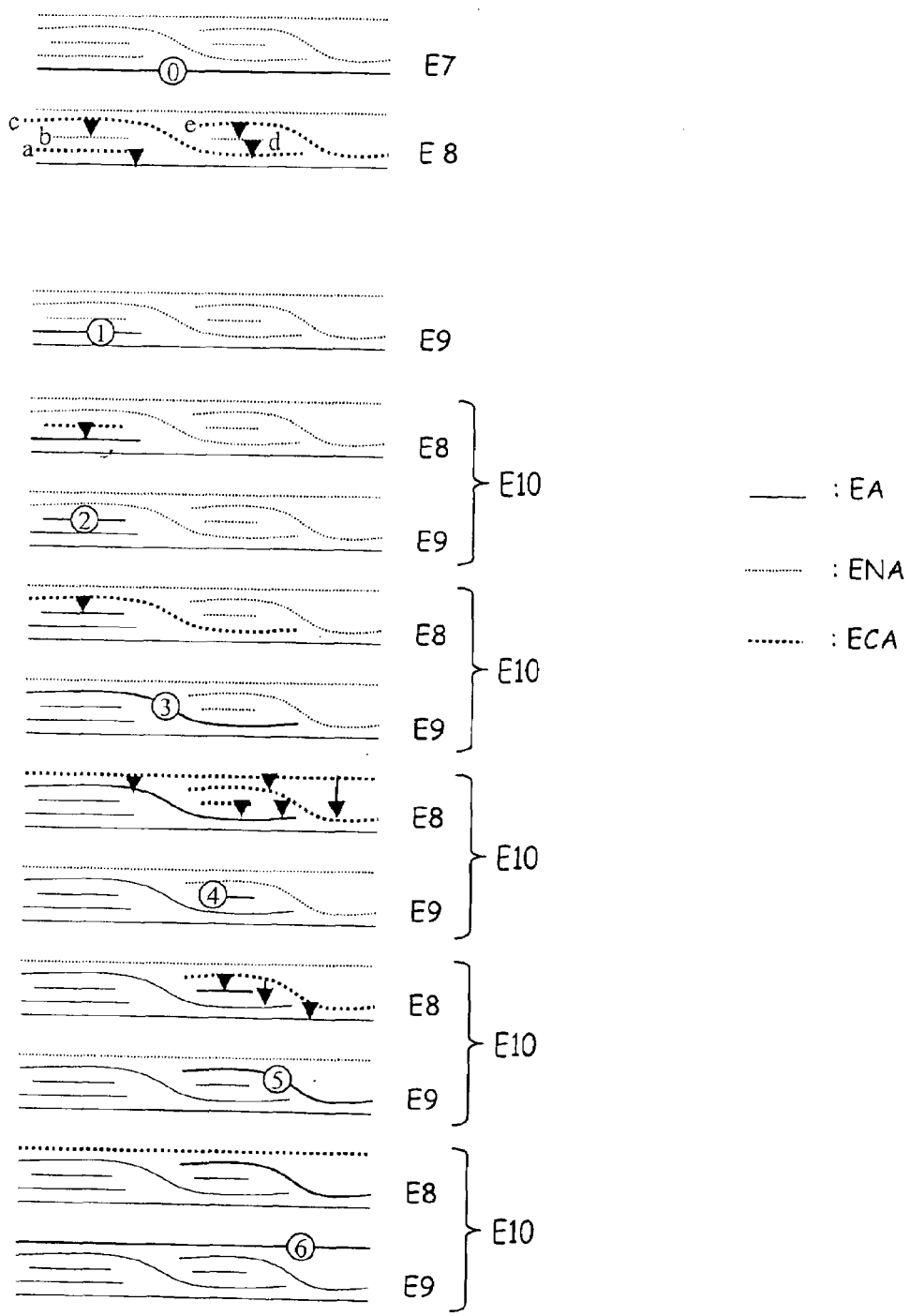
FIG. 5 diagrammatically shows the steps of determining the chronology using an "at the earliest" strategy.

According to an embodiment, determination of the chronology according to an "earliest possible" strategy comprises the following E7–E10 that are diagrammatically shown in the example of FIG. 5, with:

EA: elements already assigned to a chronological level,
ENA: elements that have not been assigned yet,
ECA: elements candidates for an assignment,
a, c and e: reflector candidates for a chronological level assignment (ECA),
b and d: reflectors that have not been assigned yet (ENA).

E7. A group of reflectors (EA) to which a chronological level number of rank $T_{up}=0$ (Ⓞ) is assigned is selected. By default, it is possible to select for example all the reflectors located at the base of the image, that is having no reflector below.

E8. All the reflectors having at least one pixel (generally a reflector portion) located just above the reflectors previously assigned to a chronological level (EA) are sought. In the example of FIG. 5, these are reflectors a, c and e. These reflectors are then reflector candidates for a chronological level assignment (ECA). Reflectors b and d are not suitable because there are reflectors located between them (that is all of their pixels) and the reflector assigned to the chronological level of rank $T_{up}$=0. These reflectors are not candidates for an assignment and they have not been assigned yet (ENA).

E9. All the reflectors placed below the reflectors found in E8 are scanned in a descending cascade (from the top to the bottom of the image) until only reflectors whose reflectors located immediately below are already assigned to a chronological level are found. The reflectors found this way are assigned to the chronological level of rank $T_{up}=T_{up}+1$. With reference to FIG. 5, the method works as follows:

reflector c is above reflector b which is a non-assigned reflector, reflector b is above reflector a that is not assigned,
reflector e is above reflector d that is not assigned,
reflector d is above reflector c that is not assigned,
thus, only reflector a can be assigned.

E10. The procedure is a repeat of initial steps of E8 and E9 of FIG. 5. It stops when all the reflectors are assigned to a chronological level. The previously assigned reflectors are no longer those of rank Tup=0, but those of rank Tup=Tup+1.

The number P of chronological levels that were necessary to classify all the reflectors is thus calculated. In the example of FIG. 5, P=6.

E8 and E9 allow determination of all of the reflectors that are entirely just above an already assigned reflector. What is understood to be all of the reflectors is all of the pixels that make up the reflector.

According to the same embodiment, the "latest possible" chronology is also determined with the same procedure as for the "earliest possible" strategy, but by downward instead of upward propagation in the image which are described as E11 to E14.

E11. A group of reflectors (EA) to which a chronological level number of rank $T_{down}$=P is assigned for example is selected. By default, it is possible to select all of the reflectors located at the top of the image, that is having no reflector above.

E12. All the reflectors having at least one pixel (generally a reflector portion) located just below the reflectors previously assigned to a chronological level (EA) are sought.

E13. All the reflectors placed above the reflectors found in stage E12 are scanned in an ascending cascade (from the bottom to the top of the image) until only reflectors whose reflectors located immediately above are already assigned to a chronological level are found. The reflectors found this way are assigned to the chronological level of rank $T_{down}=T_{down}-1$.

E14. The procedure is repeated from E12. It stops when all the reflectors are assigned to a chronological level. The previously assigned reflectors are no longer those of rank $T_{down}$=P, but those of rank $T_{down}=T_{down}-1$.

It can be noted that E11 to E14 are the reverse of steps of E7 to E10.

Figure 6:
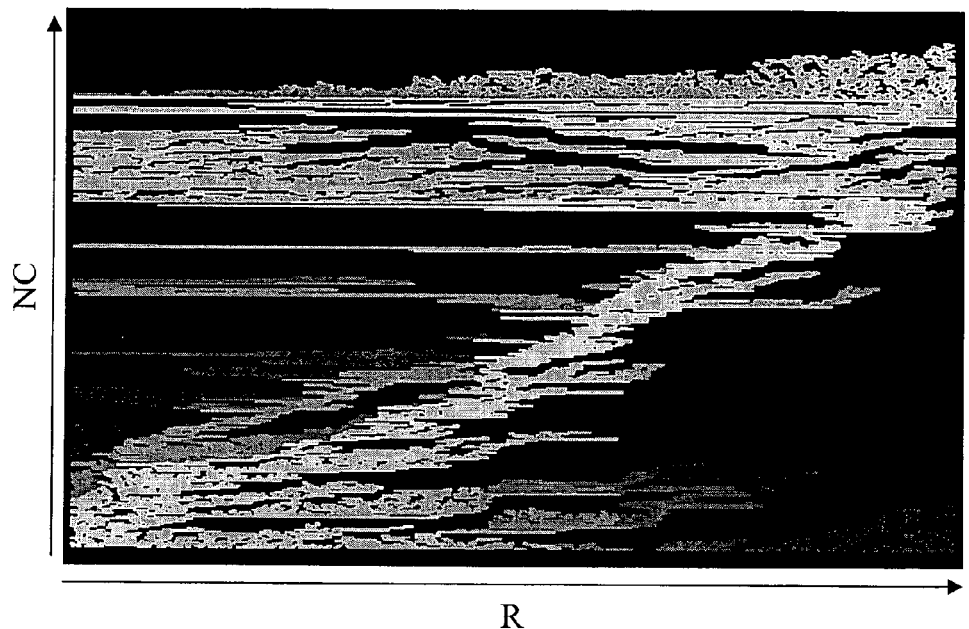
FIG. 6 shows the reflectors at the chronological levels which are assigned according to the "earliest" strategy.
Figure 7:
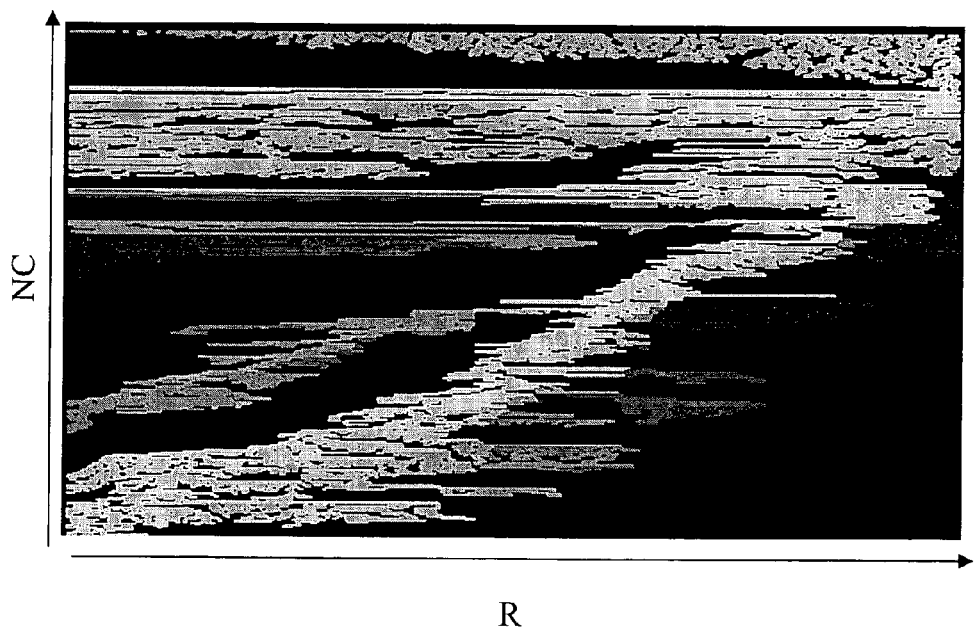
FIG. 7 shows the reflectors at the chronological levels which are assigned according to the "at the latest" strategy.

At the end of the vectorization stage, each reflector is assigned to an "earliest possible" chronological level number (denoted by $T_{up}$) and to a "latest possible" chronological level number (denoted by $T_{down}$). FIGS. 6 and 7 show the reflectors at the chronological levels to which they are assigned, according to the two "earliest possible" and "latest possible" strategies.

According to a particular embodiment, the method of constructing a chronology according to the invention can be changed so as to respect additional constraints imposed by the interpreter. The latter can in fact compel the procedure to respect one or more particular isochrones, each one being a set of reflectors specified by the interpreter, to be assigned to the same chronological level. It can be noted that the method estimates two chronologies from among the most compact chronologies and according to "earliest possible" and "latest possible" stacking strategies. By imposing some additional isochrones, the user can construct less compact chronologies if he has arguments for compelling certain reflectors belong to the same chronological level.

Figure 11A:
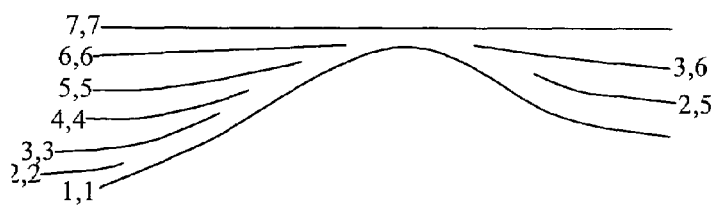
FIG. 11 shows a diagrammatic configuration illustrating the constraint of the procedure by one or more particular isochrones.
Figure 11B:
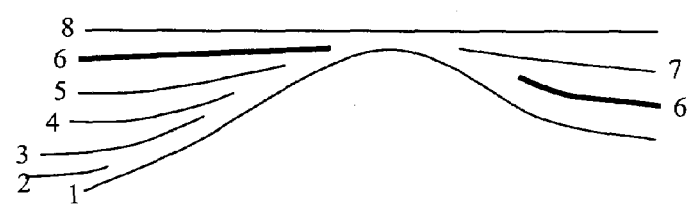
Figure 11C:
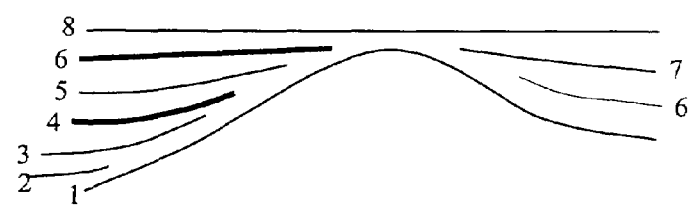

This is explained by the diagrammatic configuration of FIGS. 11A, 11B and 11C. The "earliest" and "latest" chronological levels are respectively illustrated in these diagrams: for example, "2,5" indicates that the reflector concerned is assigned to the chronological level 2 with the "latest" strategy and to level 5 with the "earliest" strategy. It is a chronological classification with 7 levels wherein the right-hand reflectors are assigned to the same chronological levels as the left-hand reflectors. The diagram of FIG. 11B shows an "earliest" chronology wherein the two reflectors in the thick line were compelled to be assigned to the same chronological level. A less compact chronology is thus obtained since it comprises 8 levels instead of 7, wherein the right-hand packet settles after the left-hand packet. The "earliest" and "latest" chronologies are then identical.

In order to take account for a constraint of this type, the method according to the invention is changed as follows: in E9 and E13 of the procedure described above, the reflectors are assigned to level $T_{up}=T_{up}+1$ (respectively $T_{down}=T_{down}-1$) only if all the reflectors belonging to their isochrone are likely to be assigned to the current chronological level. In other words, if all the reflectors of a given isochrone fulfil the conditions to be assigned to chronological level $T_{up}=T_{up}+1$ (respectively $T_{down}=T_{down}-1$), then they are assigned thereto. In the opposite case, waiting for the next passage through E9 or E13 can occur to start the test again, and so forth until the condition is met by all the reflectors of the isochrone that will be simultaneously assigned to the same chronological level $T_{up}=T_{up}+1$.

If, in E9 or E13, no reflector meets the conditions in order to be assigned to a chronological level whereas non-assigned reflectors remain, this means that the constraint cannot be utilized without breaking the premise according to which a reflector located above another reflector corresponds to a later deposit. This case is illustrated in the diagram of FIG. 11C: the reflectors shown in thick line cannot be assigned to the same chronological level.

The possibility of "forcing" the chronological classification by isochrones imposed by the user can allow the latter to progressively refine the interpretation by alternating addition of an isochrone and update of the chronology calculations, so as to reduce the initial uncertainty on the position of the isochrones.

According to the method, it is possible to use the two "earliest" and "latest" chronologies in order to refine the sedimentologic interpretation.

2—Interpretation of the Chronological Scenarios

The interpreter can obtain other very substantial information from these chronological scenarios.

a) Determination of High and Low Sedimentation Rate Zones

According to an embodiment of the method, an attribute D corresponding to the difference: $T_{down}-T_{up}$ can be calculated.

Figure 8:
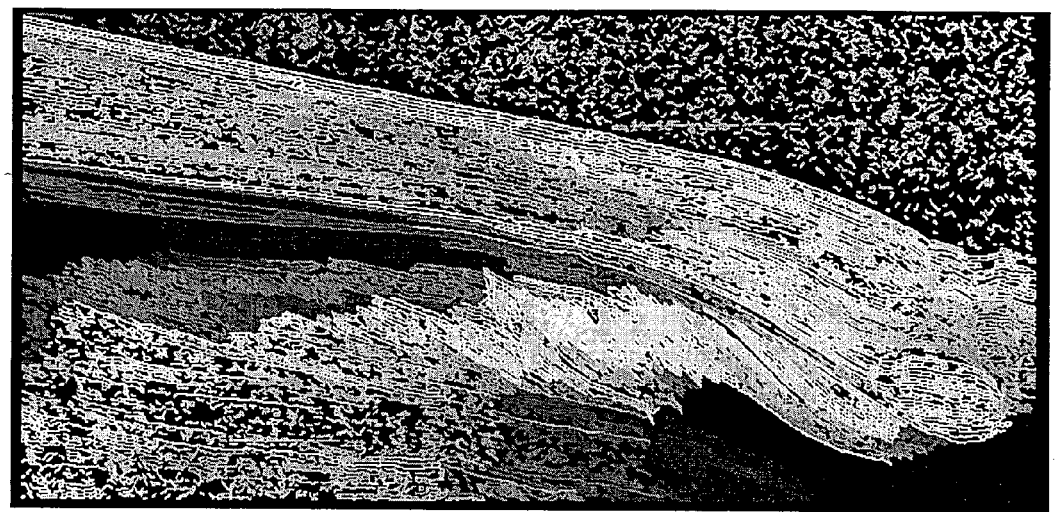
FIG. 8 illustrates the uncertainty of the location of the reflectors on the chronological scale by associating with each reflector a value of attribute D.

As illustrated by FIG. 8, a value of attribute D is associated with each reflector. This visualization allows displaying of the uncertainty on the location of the reflectors in the chronological scale. It shows groups of reflectors with a low chronostratigraphic location uncertainty (bright in FIG. 8) and groups of reflectors with a high chronostratigraphic location uncertainty (dark in FIG. 8).

The groups of reflectors with a low location uncertainty correspond to the reflectors located in high sedimentation rate zones. In fact, if the uncertainty is low, it means that these reflectors are in a zone comprising vertically a large number of reflectors in relation to other zones settled during the same period (that is in the same range of chronological levels). The presence of a large number of reflectors indicates a large number of deposition lines, hence a high average rate of sedimentation. These zones are of great interest to geologists because they often correspond to the sandiest zones, therefore likely to constitute the best oil reservoirs.

The groups of reflectors with a high location uncertainty represent groups of reflectors that have settled at a low average rate of sedimentation, or showing a gap due to an erosion of certain reflectors. In fact, if the uncertainty is high, it means that these reflectors are in a zone comprising vertically a small number of reflectors in relation to other zones settled during the same period, that is in the same range of chronological levels. The presence of a small number of reflectors indicates a small number of deposition lines, hence a low average rate of sedimentation. The gaps due to erosion are also of considerable interest because they help the interpreter to position the limit between the sediments settled in the marine domain (high rate of sedimentation) and in the continental domain (low rate of sedimentation, or even erosion) at a given time during the geologic history of the section studied. In fact, the shallow marine domain is characterized by high rates of sedimentation, the deep marine domain by low rates of sedimentation, and the continental medium by low rates of sedimentation and erosion.

b) Determination of Interfaces Between Sedimentary Bodies

Figure 9:
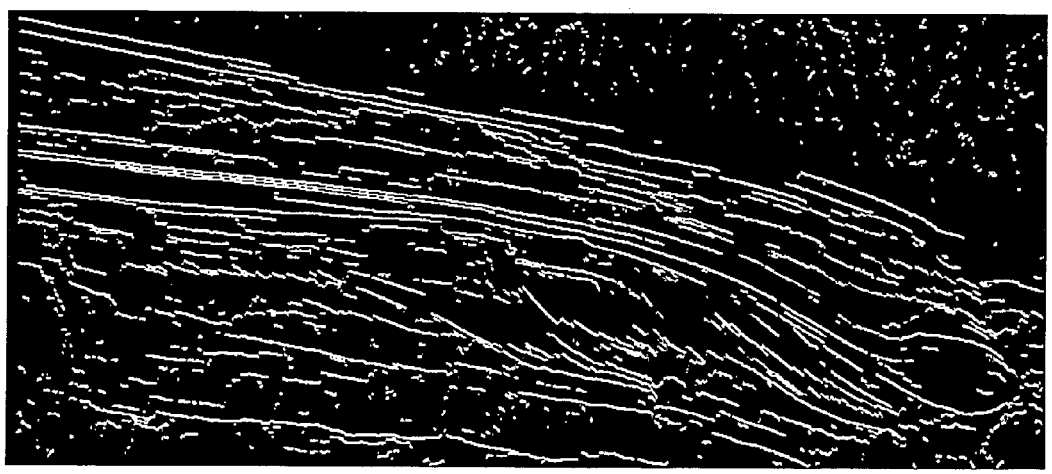
FIG. 9 shows interfaces between sedimentary bodies by associating with each reflector a value of attribute D'.

As seen from above, calculation and display of attribute D allows individualizing by the eye groups of reflectors taking the same value of attribute D; these groups are representative in terms of stratigraphy and help the interpreters in performing their task. In order to bring out the contours of these groups of reflectors, that is their interface with the other groups, attribute D' can be calculated at any pixel of a reflector, and defined as follows: attribute D' is the difference between the value of attribute D of the reflector passing through the current pixel and the value of attribute D of the reflector located immediately above (or below) the current reflector, in line with the pixel considered. The value taken by this attribute D' is represented in FIG. 9 where these characteristic surfaces can be clearly seen, generally associated with erosion surfaces or flooding surfaces due to the sea level variations.

c) Seeking Isochrones: Position and Uncertainty

One of the most conventional tasks provided to the interpreter is seeking lines referred to as isochrones. An isochrone represents the line on the seismic section of the topographic surface at a given time during the geologic history of the subsoil. Within the context of the hypothesis wherein deposition of the sediments corresponds to a compact chronology, values $T_{up}$ and $T_{down}$ allow determination of the position of the isochrone for any given chronological level $T_{iso}$, as well as the range of uncertainty on this position. This is achieved by showing the reflectors in three different colour codes corresponding to the three domains defined as follows:

all the reflectors whose "earliest" chronological level comes after the level sought ($T_{up} > T_{iso}$) make up domain I;

all the reflectors whose "latest" chronological level is prior to the level sought ($T_{down} < T_{iso}$) make up domain II;

all the reflectors that may have potentially settled at the level sought ($T_{up} < T_{iso}, < T_{down}$) make up domain III.

Figure 10:
FIG. 10 illustrates the search for isochrones by displaying the reflectors according to three different color codes.

The result of such a color codification is illustrated in FIG. 10. The isochrone sought is at the interface of domains I and II, and runs through domain III. Domain III represents the domain of uncertainty on the position of the isochrone. The interpreter can then pick the isochrone in this uncertainty domain III.

3—Extension of the Invention to Three-Dimensional Images

More and more often, seismic acquisitions relate to a volume of the subsoil instead of being limited to a vertical section. The image produced then has the form of a cube of voxels of origin O, comprising nZ layers (or vertical discretization interval along the Z-axis), nX horizontal discretization intervals along the X-axis and nY horizontal discretization intervals along the Y-axis.

A vertical section of this cube parallel to plane OXZ is referred to as inline. A vertical section of the cube parallel to plane OYZ is referred to as crossline.

Figure 12:
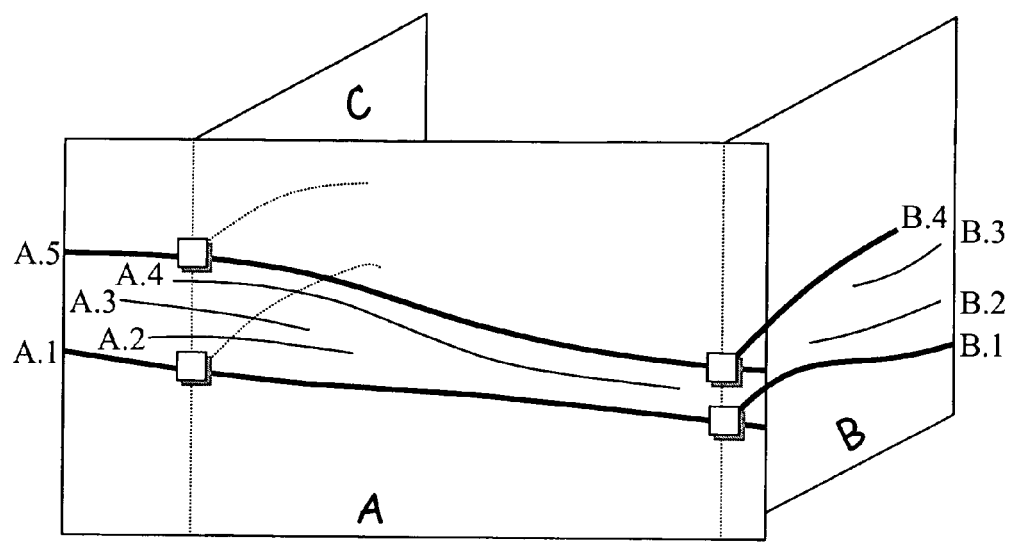
FIG. 12 illustrates the extension of the invention to three-dimensional images.

In order to extend the invention to the three-dimensional case, the reflector vectorization method is applied to any selection of inlines and crosslines. The reflector binarization and vectorization stage is carried out independently on each section. Isochrones are thereafter constructed by assembling the reflectors that intersect on the intersection lines between the sections. Then, the chronological classification of the reflectors is performed on all of the reflectors extracted from all the sections considered, by applying the forcing technique by the isochrones thus defined. In the example of FIG. 12, the chronological classification of the reflectors is carried out by accounting for the two isochrones made up of reflectors A1 and B1, and A5 and B4 respectively. A represents an inline, B and C represent two crosslines. The white squares represent the crossing of the reflectors at the intersection lines between the inlines and the crosslines.

The invention claimed is:

1. A method for reconstructing depositional conditions under which sedimentary layers have formed, from chronological classifications of reflectors forming lines of pixels extracted from an image representing seismic signal amplitudes, comprising:

A. Carrying out iteratively an estimation of a first and of a second chronological scenario of the-deposition of the sedimentary layers, by assigning to each one of the reflectors two chronological level numbers, Tup and Tdown respectively, determined as follows:

a) assigning an initial first chronological level number Tup to a first group of reflectors, and an initial second chronological level number Tdown to a second group of reflectors, the second group being the first group of reflectors when there is no reflector above the first group;

b) assigning a chronological level number Tup=Tup+1 to the-reflectors of pixels located above the reflectors of the first group and above no other reflector, these reflectors assigned to level Tup+1 making up new reflectors of the first group;

c) starting again from b), and stopping when all the reflectors of the first group are assigned to Tup;

d) assigning a chronological level number Tdown=Tdown−1 to the reflectors of pixels located below the reflectors of the second group and below no other reflector, these reflectors assigned to level Tdown−1 making up the new reflectors of the second group;

e) starting again from d), and stopping when all the reflectors of the second group are assigned to Tdown;

B. Performing an interpretation of the chronological scenarios so as to reconstruct the depositional conditions; and C. Displaying an image of the depositional conditions.

2. A method as claimed in claim 1, wherein estimation of a chronological scenario involves at least one additional constraint imposed by an interpreter.

3. A method as claimed in claim 2, wherein the at least one additional constraint is an isochrone comprising a set of reflectors to be assigned to a same chronological level.

4. A method as claimed in claim 3 wherein, the image has three dimensions and is defined by a first set of sections and a second set of sections perpendicular to the first set of sections and estimation of chronological scenarios comprises:
    defining a selection of sections of the first and of the second set of sections;
    constructing isochrones by assembling reflectors that intersect on intersection lines between the first and second set of perpendicular sections of the selection of sections; and
    carrying out an estimation of the chronological scenarios for all reflectors extracted from all selected sections, by utilizing as a constraint the isochrones.

5. A method as claimed in claim 4, wherein optimization of reflectors comprises at least one of the following stages:
    carrying out a transformation of the image into an image comprising only two color levels;
    making a change in the image with two color levels by transforming lineations of the image into lines having a same relation and whose thickness is that of a pixel, from a mathematical morphology operation;
    constructing reflectors by splitting up each line having ramifications from a vectorization technique; and
    carrying out an optimization of geometry of the reflectors.

6. A method as claimed in claim 3, wherein the chronological scenarios are interpreted by defining zones of a low and of a high rate of sedimentation by means of an attribute D defined as a difference between the chronological level numbers $T_{up}$ and the chronological level numbers $T_{down}$, at each pixel of the image.

7. A method as claimed in claim 6, wherein the chronological scenarios are interpreted by defining interfaces between sedimentary bodies of the underground medium by means of an attribute D' calculated at any pixel of a reflector, and defined as a difference between a value of an attribute D of a reflector passing through any pixel of the reflector and the value of an attribute D of a reflector located just above or below the reflector, in line with any pixel of the reflector.

8. A method as claimed in claim 3, wherein the chronological scenarios are interpreted by determining a position of an isochrone for a given chronological level numbered $T_{iso}$, as well as an uncertainty range for the position of the isochrone, by displaying the reflectors according to three different color codes corresponding to three different domains defined as follows:
    all reflectors with a chronological level number $T_{up}$ coming after a level number sought $T_{iso\ 1\ (T_{up}>T_{iso})}$ make up domain I;
    all the reflectors whose chronological level number $T_{down}$ is prior to a level number sought $T_{iso}(T_{down}<T_{iso})$ make up domain II; and
    all the reflectors that may have potentially settled at a level sought $(T_{up}<T_{iso}<T_{down})$ make up domain III, which is an uncertainty domain.

9. A method as claimed in claim 3, wherein extraction of reflectors comprises at least one of the following:
    carrying out a transformation of the image into an image comprising only two color levels;
    making a change in the image with two color levels by transforming lineations of the image into lines having a same relation and whose thickness is that of a pixel, from a mathematical morphology operation;
    constructing reflectors by splitting up each line having ramifications from a vectorization technique; and
    carrying out an optimization of geometry of the reflectors.

10. A method as claimed in claim 3, wherein optimization of reflectors comprises at least one of the following stages:
    carrying out a transformation of the image into an image comprising only two color levels;
    making a change in the image with two color levels by transforming lineations of the image into lines having a same relation and whose thickness is that of a pixel, from a mathematical morphology operation;
    constructing reflectors by splitting up each line having ramifications from a vectorization technique; and
    carrying out an optimization of geometry of the reflectors.

11. A method as claimed in claim 2, wherein the chronological scenarios are interpreted by defining zones of a low and of a high rate of sedimentation by means of an attribute D defined as a difference between the chronological level numbers $T_{up}$ and the chronological level numbers $T_{down}$, at each pixel of the image.

12. A method as claimed in claim 10, wherein the chronological scenarios are interpreted by defining interfaces between sedimentary bodies of the underground medium by means of an attribute D' calculated at any pixel of a reflector, and defined as a difference between a value of an attribute D of a reflector passing through any pixel of the reflector and the value of an attribute D of a reflector located just above or below the reflector, in line with any pixel of the reflector.

13. A method as claimed in claim 2, wherein the chronological scenarios are interpreted by determining a position of an isochrone for a given chronological level numbered $T_{iso}$, as well as an uncertainty range for the position of the isochrone, by displaying the reflectors according to three different color codes corresponding to three different domains defined as follows:
    all reflectors with a chronological level number $T_{up}$ coming after a level number sought $T_{iso}(T_{up}>T_{iso})$ make up domain I;
    all the reflectors whose chronological level number $T_{down}$ is prior to a level number sought $T_{iso}(T_{down}<T_{iso})$ make up domain II; and
    all the reflectors that may have potentially settled at a level sought $(T_{up}<T_{iso}<T_{down})$ make up domain III, which is an uncertainty domain.

14. A method as claimed in claim 2, wherein extraction of reflectors comprises at least one of the following:
    carrying out a transformation of the image into an image comprising only two color levels;
    making a change in the image with two color levels by transforming lineations of the image into lines having a same relation and whose thickness is that of a pixel, from a mathematical morphology operation;

constructing reflectors by splitting up each line having ramifications from a vectorization technique; and carrying out an optimization of geometry of the reflectors.

15. A method as claimed in claim 2, wherein optimization of reflectors comprises at least one of the following:

carrying out a transformation of the image into an image comprising only two color levels;

making a change in the image with two color levels by transforming lineations of the image into lines having a same relation and whose thickness is that of a pixel, from a mathematical morphology operation;

constructing reflectors by splitting up each line having ramifications from a vectorization technique; and carrying out an optimization of geometry of the reflectors.

16. A method as claimed in claim 1, wherein the chronological scenarios are interpreted by defining zones of a low and of a high rate of sedimentation by means of an attribute D defined as a difference between the chronological level numbers $T_{up}$ and the chronological level numbers $T_{down}$, at each pixel of the image.

17. A method as claimed in claim 16, wherein the chronological scenarios are interpreted by defining interfaces between sedimentary bodies of an underground medium by means of an attribute D' calculated for any pixel of a reflector, and defined as a difference between a value of the attribute D of a reflector passing through any pixel of the reflector and a value of the attribute D of a reflector located just above or below the reflector, in line with any pixel of the reflector.

18. A method as claimed in claim 17, wherein the chronological scenarios are interpreted by determining a position of an isochrone for a given chronological level numbered $T_{iso}$, as well as an uncertainty range for the position of the isochrone, by displaying the reflectors according to three different color codes corresponding to three different domains defined as follows:

all reflectors with a chronological level number $T_{up}$ coming after a level number sought $T_{iso}(T_{up}>T_{iso})$ make up domain I;

all the reflectors whose chronological level number $T_{down}$ is prior to a level number sought $T_{iso}(T_{down}<T_{iso})$ make up domain II; and all the reflectors that may have potentially settled at a level sought $(T_{up}<T_{iso}<T_{down})$ make up domain III, which is an uncertainty domain.

19. A method as claimed in claim 17, wherein extraction of reflectors comprises at least one of the following:

carrying out a transformation of the image into an image comprising only two color levels;

making a change in the image with two color levels by transforming lineations of the image into lines having a same relation and whose thickness is that of a pixel, from a mathematical morphology operation;

constructing reflectors by splitting up each line having ramifications from a vectorization technique; and carrying out an optimization of geometry of the reflectors.

20. A method as claimed in claim 17, wherein optimization of reflectors comprises at least one of the following stages:

carrying out a transformation of the image into an image comprising only two color levels;

making a change in the image with two color levels by transforming lineations of the image into lines having a same relation and whose thickness is that of a pixel, from a mathematical morphology operation;

constructing reflectors by splitting up each line having ramifications from a vectorization technique; and carrying out an optimization of geometry of the reflectors.

21. A method as claimed in claim 16, wherein the chronological scenarios are interpreted by determining a position of an isochrone for a given chronological level numbered $T_{iso}$, as well as an uncertainty range for the position of the isochrone, by displaying the reflectors according to three different color codes corresponding to three different domains defined as follows:

all reflectors with a chronological level number $T_{up}$ coming after a level number sought $T_{iso}(T_{up}>T_{iso})$ make up domain I;

all the reflectors whose chronological level number $T_{down}$ is prior to a level number sought $T_{iso}(T_{down}<T_{iso})$ make up domain II; and all the reflectors that may have potentially settled at a level sought $(T_{up}<T_{iso}, <T_{down})$ make up domain III, which is an uncertainty domain.

22. A method as claimed in claim 16, wherein extraction of reflectors comprises at least one of the following:

carrying out a transformation of the image into an image comprising only two color levels;

making a change in the image with two color levels by transforming lineations of the image into lines having a same relation and whose thickness is that of a pixel, from a mathematical morphology operation;

constructing reflectors by splitting up each line having ramifications from a vectorization technique; and carrying out an optimization of geometry of the reflectors.

23. A method as claimed in claim 16, wherein optimization of reflectors comprises at least one of the following stages:

carrying out a transformation of the image into an image comprising only two color levels;

making a change in the image with two color levels by transforming lineations of the image into lines having a same relation and whose thickness is that of a pixel, from a mathematical morphology operation;

constructing reflectors by splitting up each line having ramifications from a vectorization technique; and carrying out an optimization of geometry of the reflectors.

24. A method as claimed in claim 1, wherein the chronological scenarios are interpreted by determining a position of an isochrone for a given chronological level numbered $T_{iso}$, as well as an uncertainty range for the position of the isochrone, by displaying the reflectors according to three different color codes corresponding to three different domains defined as follows:

all reflectors with a chronological level number $T_{up}$ coming after a level number sought $T_{iso}(T_{up}>T_{iso})$ make up domain I;

all the reflectors whose chronological level number $T_{down}$ is prior to a level number sought $T_{iso}(T_{down}<T_{iso})$ make up domain II; and all the reflectors that may have potentially settled at a level sought $(T_{up}<T_{iso}, <T_{down})$ make up domain III, which is an uncertainty domain.

25. A method as claimed in claim 24, wherein extraction of reflectors comprises at least one of the following:

carrying out a transformation of the image into an image comprising only two color levels;

making a change in the image with two color levels by transforming lineations of the image into lines having a same relation and whose thickness is that of a pixel, from a mathematical morphology operation;

constructing reflectors by splitting up each line having ramifications from a vectorization technique; and carrying out an optimization of geometry of the reflectors.

26. A method as claimed in claim 16, wherein optimization of reflectors comprises at least one of the following stages:

carrying out a transformation of the image into an image comprising only two color levels;

making a change in the image with two color levels by transforming lineations of the image into lines having a same relation and whose thickness is that of a pixel, from a mathematical morphology operation;

constructing reflectors by splitting up each line having ramifications from a vectorization technique; and carrying out an optimization of geometry of the reflectors.

27. A method as claimed in claim 1, wherein extraction of the reflectors comprises at least once the following:

carrying out a transformation of the image into an image comprising only two color levels;

making a change in the image with two color levels by transforming lineations of the image into lines having a same relation and whose thickness is that of a pixel, from a mathematical morphology operation;

constructing the reflectors by splitting up each line having ramifications from a vectorization technique; and carrying out an optimization of the geometry of the reflectors.

28. A method as claimed in claim 27, wherein optimization of reflectors comprises at least one of the following:

carrying out a transformation of the image into an image comprising only two color levels;

making a change in the image with two color levels by transforming lineations of the image into lines having a same relation and whose thickness is that of a pixel, from a mathematical morphology operation;

constructing reflectors by splitting up each line having ramifications from a vectorization technique; and carrying out an optimization of geometry of the reflectors.

29. A method as claimed in claim 1, wherein optimization of the reflectors comprises at least one of the following:

a) separating reflectors having a common end and testing two by two these separated reflectors so as to select reflector pairs whose orientations at an end form an angle of 180°, with a tolerance threshold, then reuniting, among the selected pairs, a pair that will form, after welding, a longest reflector;

b) eliminating reflectors having at least one of the following characteristics: a length which is shorter in relation to the average length of the reflectors, greater tortuosity than the average tortuosity and an average orientation close to the vertical; and c) splitting up some reflectors so that each reflector represents a broken line that has no cusp and no bifurcation, and intersects no other reflector.

* * * * *